US008967847B2

(12) United States Patent
Huang

(10) Patent No.: US 8,967,847 B2
(45) Date of Patent: Mar. 3, 2015

(54) ILLUMINATION ASSEMBLY AND DISPLAY MODULE

(75) Inventor: Sheng-Shan Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 186 days.

(21) Appl. No.: 13/612,322

(22) Filed: Sep. 12, 2012

(65) Prior Publication Data
US 2013/0279190 A1 Oct. 24, 2013

(30) Foreign Application Priority Data
Apr. 20, 2012 (TW) .............................. 101114239 A

(51) Int. Cl.
F21V 7/04 (2006.01)

(52) U.S. Cl.
USPC .......... 362/617; 362/97.1; 362/608; 362/615; 362/623

(58) Field of Classification Search
USPC ....................... 362/97.1, 97.2, 97.3, 608–613, 362/615–617, 621–624, 627; 349/61–65
See application file for complete search history.

(56) References Cited

U.S. PATENT DOCUMENTS

| 6,341,872 | B1 | 1/2002 | Goto | |
|---|---|---|---|---|
| 6,951,401 | B2 | 10/2005 | Van Hees et al. | |
| 7,099,553 | B1 * | 8/2006 | Graham et al. | 385/146 |
| 2001/0019380 | A1 * | 9/2001 | Ishihara | 349/65 |
| 2006/0158437 | A1 * | 7/2006 | Blythe et al. | 345/173 |
| 2007/0274099 | A1 * | 11/2007 | Tai et al. | 362/610 |
| 2008/0278460 | A1 * | 11/2008 | Arnett et al. | 345/175 |
| 2009/0058832 | A1 | 3/2009 | Newton | |
| 2009/0147535 | A1 | 6/2009 | Mienko et al. | |
| 2010/0123682 | A1 | 5/2010 | Juni | |
| 2012/0249921 | A1 * | 10/2012 | Yu et al. | 349/62 |

FOREIGN PATENT DOCUMENTS

| CN | 101739181 A | 6/2010 |
|---|---|---|
| CN | 101802759 A | 8/2010 |
| TW | M269460 | 7/2005 |
| TW | M325685 | 1/2008 |
| TW | 200933556 | 8/2009 |
| TW | I315431 | 10/2009 |
| TW | M406218 | 6/2011 |
| TW | M408047 | 7/2011 |

* cited by examiner

Primary Examiner — Thomas A Hollweg
Assistant Examiner — Kevin Quarterman
(74) Attorney, Agent, or Firm — Muncy, Geissler, Olds & Lowe, P.C.

(57) ABSTRACT

An illumination assembly is adapted to illuminate a display module that is visible by reflecting environmental lights. The illumination assembly includes a substrate, a visual-light source, and a light guide. The substrate includes a top surface. The visual-light source is disposed on the top surface and is provided for emitting a visual light. The light guide is disposed corresponding to the top surface of the substrate. The light guide includes a light-incidence surface and a light-emergence surface. The visual light enters the light guide through the light-incidence surface and is reflected at least once. The visual light then exits the light guide through the light-emergence surface and travels along a light-emergence direction.

13 Claims, 8 Drawing Sheets

ILLUMINATION ASSEMBLY AND DISPLAY MODULE

CROSS-REFERENCES TO RELATED APPLICATIONS

This non-provisional application claims priority under 35 U.S.C. §119(a) on Patent Application No. 101114239 filed in Taiwan, R.O.C. on Apr. 4, 2012, the entire contents of which are hereby incorporated by reference.

BACKGROUND

1. Technical Field

The disclosure relates to an illumination assembly, in particular to an illumination assembly adapted to illuminate a display panel that is visible by reflecting environmental lights.

2. Related Art

Electro-Phoretic Display (EPD, also known as E-paper) has characteristics such as low power consumption and suitability for long term reading, and is therefore applied broadly to E-book apparatuses as the display panel installed therein.

EPD basically applies reflective-display technology, which displays a visible screen for a user mainly by reflecting environmental lights. However, under a low illumination environment, the screen displayed on such reflective type display panel is not readable for by user.

In order to resolve the problem under a low illumination environment, several traditional illumination solutions are proposed for liquid crystal displays. For example, U.S. Pat. No. 6,951,401 discloses a display illumination device, which includes two stacked light guides and a reflecting component for broadly distributing lights from a light source to a liquid crystal display panel; accordingly, the liquid crystals in the liquid crystal display panel may be illuminated by a backlight method. However, the design of two stacked light guides and a reflecting component in U.S. Pat. No. 6,951,401 obviously increase the thickness of the entire display module. U.S. Pat. No. 6,341,872 introduced another display illumination device, which includes a light guide and a light source. The light guide is stacked on the liquid crystal display panel. The light source is disposed at a side of the light guide for emitting lights from a lateral side, through the light guide and distributing lights to the liquid crystal display panel. In U.S. Pat. No. 6,341,872, the display module must reserve a certain border width to accommodate the light source and the light guide, which not only increases the border width, but also reduces the contrast ratio and reflectance of the liquid crystal display panel due to the light guide stacked thereon. In the prior art, the suitable illumination solutions mostly increase the border width or the thickness of the display module. More importantly, most of the traditional solutions are used to resolve the illumination problems on the liquid crystal display panel with backlight module. As for an EPD without a backlight module, relying on environmental light to illuminate the displayed screen, there is scarcely any suitable solution.

SUMMARY

In the prior art, the displayed screen on a reflective display panel is not readable under a low illumination environment. If an illumination assembly is attached directly to the reflective display panel, the border width or the thickness of the display module will also increase. In one or more embodiments of the disclosure, an illumination assembly is disclosed to resolve the problem of readability under low illumination environment for the reflective display panel, without overly increasing the border width or the thickness of the display panel.

In one or more embodiments of the disclosure, an illumination assembly is adapted to illuminate a display panel that is visible by reflecting environmental lights. The illumination assembly includes a substrate, at least a visual-light source and a light guide.

The substrate includes a side. The visual-light source is disposed at the side of the substrate for emitting a visual light. The light guide is transparent and disposed corresponding to the side of the substrate. The light guide includes a light-incidence surface and a light-emergence surface aligned unparallel to each other. The visual light enters through the light-incidence surface and reflects in the light guide at least once, and then exiting through the light-emergence surface along a light-emergence direction different from a light-incidence direction.

In one or more embodiments of the disclosure, a display module includes a substrate, at least a visual-light source, a display panel and a light guide.

The substrate includes a side. The at least a visual-light source is disposed at the side of the substrate for emitting a visual light. The light guide is transparent and disposed corresponding to the side of the substrate. The light guide includes a light-incidence surface and a light-emergence surface aligned unparallel to each other. The visual light enters through the light-incidence surface and is reflected in the light guide at least once, and then exits through the light-emergence surface along a light-emergence direction different from a light-incidence direction.

By transferring the travelling direction of the visual light through the light guide, the visual-light source is able to be disposed on the substrate and hidden between the substrate and the display panel. Therefore, in the embodiments of the disclosure, the visual-light source does not need to be disposed at the edge of the display panel. By controlling the height of the light-emergence surface, the height of the illumination assembly raised on the display panel is able to be reduced greatly, thereby reducing the overall thickness and the border width of the display module.

BRIEF DESCRIPTION OF THE DRAWINGS

The disclosure will become more fully understood from the detailed description given herein below for illustration only, and thus not limitative of the present invention, wherein.

DETAILED DESCRIPTION

Figure 1:
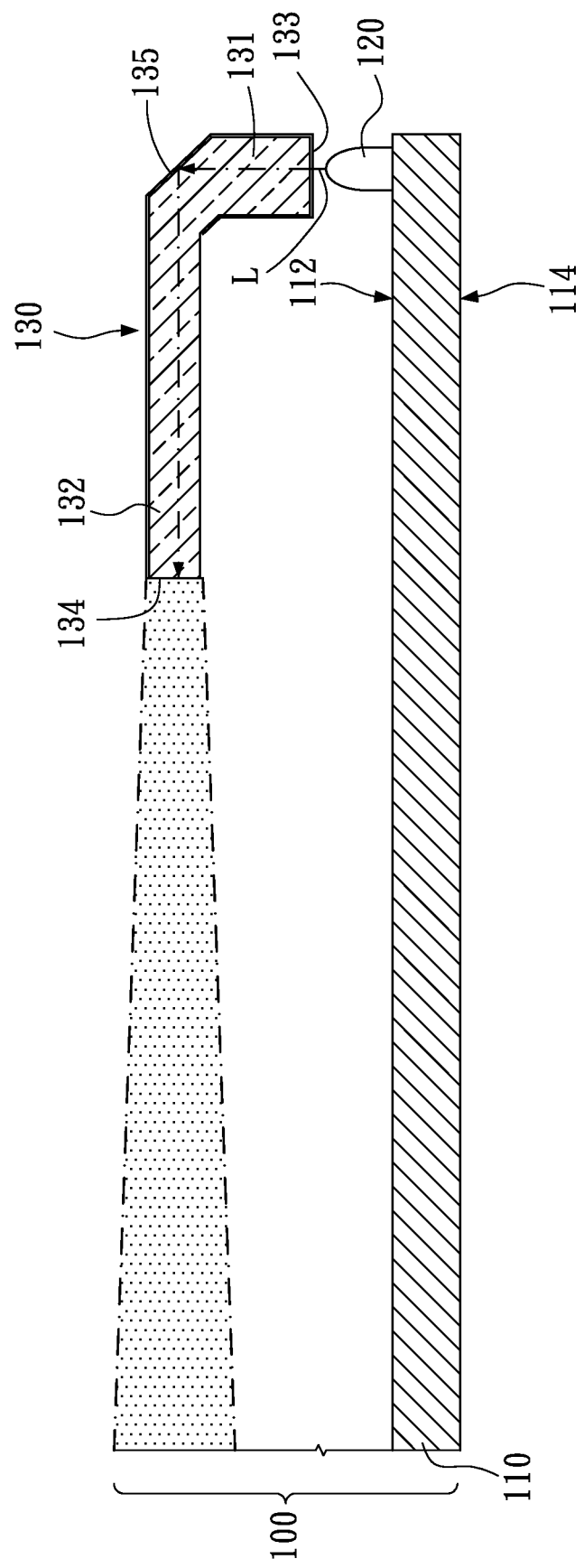
FIG. 1 is a cross-sectional view of an illumination assembly according to a first embodiment of the disclosure.

Please refer to FIG. 1, which illustrates an illumination assembly 100 according to a first embodiment of the disclosure. The illumination assembly 100 is adapted to illuminate a display panel 210 that is visible by reflecting environmental lights. The illumination assembly 100 includes a substrate 110, a visual-light source 120 and a light guide 130.

As shown in FIG. 1, the substrate 110 may be realized by a printed circuit board or a general board with distributed electrical wires for providing electric power and signal transmissions. The substrate 110 is disposed in an accommodating space within an electronic apparatus and is fixed inside the housing of the electronic apparatus. The substrate 110 includes a top surface 112 and a bottom surface 114. The top surface 112 and the bottom surface 114 are designed for disposing different components, and are both electrically connected with electric circuits of the substrate 110.

As shown in FIG. 1, the visual-light source 120 is disposed at least a side of the substrate 110 or a position close to the side of the substrate 110, preferably a top surface 112 of the side. The visual-light source 120 is electrically connected with electric circuits of the substrate 110 to obtain electricity power from the substrate 110. In application examples of using a metal board as the substrate 110, the visual-light source 120 is able to dissipate heats through the substrate 110. The visual-light source 120 is to at least emit a visual light. In the first embodiment, the position of the visual-light source 120 is close to an edge of the substrate 110. The visual-light source 120 emits visual lights toward an emitting direction away from the top surface 112, so that the emitting direction of the visual light is vertical to the top surface 112 of the substrate 110. A practical embodiment for the visual-light source 120 is a light emitting diode.

As shown in FIG. 1, the light guide 130 is disposed corresponding to the top surface 112 of the substrate 110. The light guide 130 includes a first light-guiding section 131 and a second light-guiding section 132. The first light-guiding section 131 and the second light-guiding section 132 connect to each other and respectively extend toward vertical directions, so that the appearance of the light guide 130 is approximately L-shaped; preferably, the first light-guiding section 131 and the second light-guiding section 132 is an integrally formed single transparent component.

Furthermore, the light guide 130 further includes a light-incidence surface 133 and a light-emergence surface 134. The light-incidence surface 133 is located at a free end of the first light-guiding section 131, and the light-emergence surface 134 is located at a free end of the second light-guiding section 132, so that the light-incidence surface 133 and the light-emergence surface 134 are respectively located at the two ends of the light guide 130.

As shown in FIG. 1, the first light-guiding section 131 and the substrate 110 are approximately vertical to each other, so that the light-incidence surface 133 is approximately parallel to the top surface 112 and facing visual-light source 120. The emitting direction of the visual light emitted by the visual-light source 120, is approximately vertical to the top surface 112 of the substrate 110. The visual light enters light guide 130 through the light-incidence surface 133, reflects at least once in the light guide 130, and then exit through the light-emergence surface 134 along a light-emergence direction. The second light-guiding section 132 is approximately parallel to the substrate 110, and accordingly the light-emergence surface 134 is vertical to the substrate 110, so that the light-emergence direction is parallel to the substrate 110; wherein, the height of the light-emergence surface 134 vertical to the top surface 112 is preferably 0.8 mm-1 mm.

As shown in FIG. 1, in order to make the visual light reflect in the light guide 130 at least once, the light guide 130 further includes a first reflecting surface 135 located at an intersection of the first light-guiding section 131 and the second light-guiding section 132. Specifically, the first reflecting surface 135 is located at a vertical bending portion of the light guide 130. In a practical embodiment, the first reflecting surface 135 and the light-incidence surface 133 have an angle of 45 degrees, and the first reflecting surface 135 and the light-emergence surface 134 have another angle of 45 degrees.

As shown in FIG. 1, the first reflecting surface 135 is applied to reflect the lights. When the visual light travels in the first light-guiding section 131 to arrive the vertical bending portion of the light guide 130, the first reflecting surface 135 reflects the visual light and makes the visual light travels along the second light-guiding section 132, and then exit through the light-emergence surface 134 along the light-emergence direction. In a practical embodiment, the material of the light guide 130 has a selected index of refraction, so that the visual light is able to have a full reflection when arriving at the first reflecting surface 135; in another practical embodiment, the light guide 130 at least has its external surface of the vertical bending portion polished and coated with a film, so as to form the first reflecting surface 135 inside the light guide 130.

Figure 2:
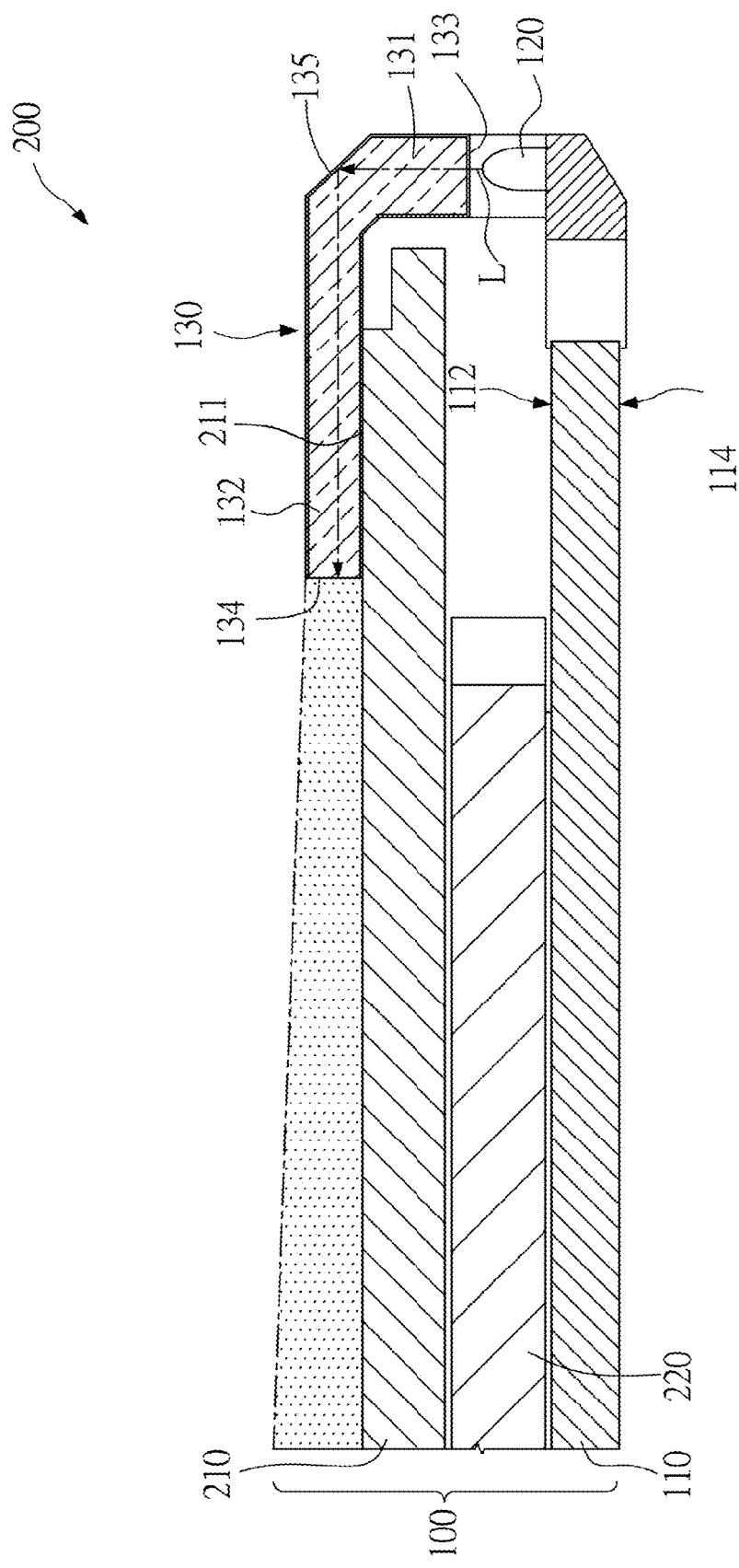
FIG. 2 is a cross-sectional view of a display module according to the first embodiment of the disclosure.

Please refer to FIG. 2, which illustrates a display module 200 according to the first embodiment of the disclosure; the display module 200 integrates the aforesaid illumination assembly 100 therein. The display module 200 includes the illumination assembly 100 as mentioned above, a display panel 210 and an isolation sheet 220.

The structure of the illumination assembly 100 is similar to the embodiment described previously, so the related descriptions are omitted. The display panel 210 is disposed upon the top surface 112 of the substrate 110 for displaying a screen image, and the visual-light source 120 is disposed between the display panel 210 and the substrate 110. The display panel 210 uses reflective-display technology and allows the user to read the displayed screen image by reflecting environmental lights. A practical embodiment of the display panel 210 is an Electro-Phoretic Display (EPD), also known as E-paper.

The isolation sheet 220 is disposed on the top surface 112 of the substrate 110, between the display panel 210 and the substrate 110, so that a certain interval is maintained between the display panel 210 and the substrate 110, and the display panel 210 is supported to remain on the top surface 112 of the substrate 110.

The second light-guiding section 132 of the light guide 130 is approximately located at a side 211 upper than the display panel 210, so that the light-emergence surface 134 is located upper than the display panel 210, with the light-emergence direction approximately parallel to the display panel 210 or having a small angle (e.g. 30 degrees), between the light-emergence direction and the display panel 210. Through the guiding of the light guide 130, the visual light emitted by the visual-light source 120 is transferred to travel along the display panel 210 and be reflected by the display panel 210, so that the user is able to read the displayed screen image by the reflected visual light.

By transferring the traveling direction of the visual light through the light guide 130, the visual-light source 120 is able to be hidden on the substrate 110 without be directly disposed at the edge or on the edge of the display panel 210. By controlling the height of the light-emergence surface 134, the height of the illumination assembly 100 raised on the display panel 210 is able to be reduced greatly, thereby reducing the overall thickness of the display module 200.

Figure 3:
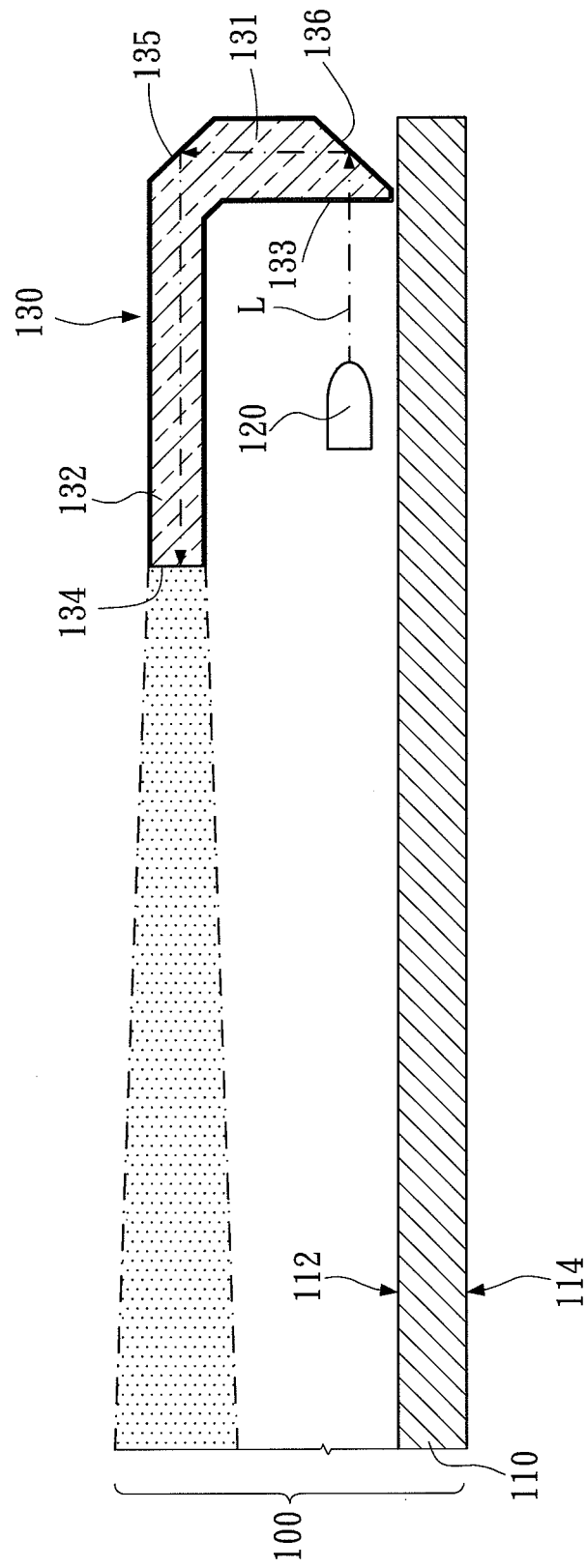
FIG. 3 is a cross-sectional view of an illumination assembly according to a second embodiment of the disclosure.
Figure 4:
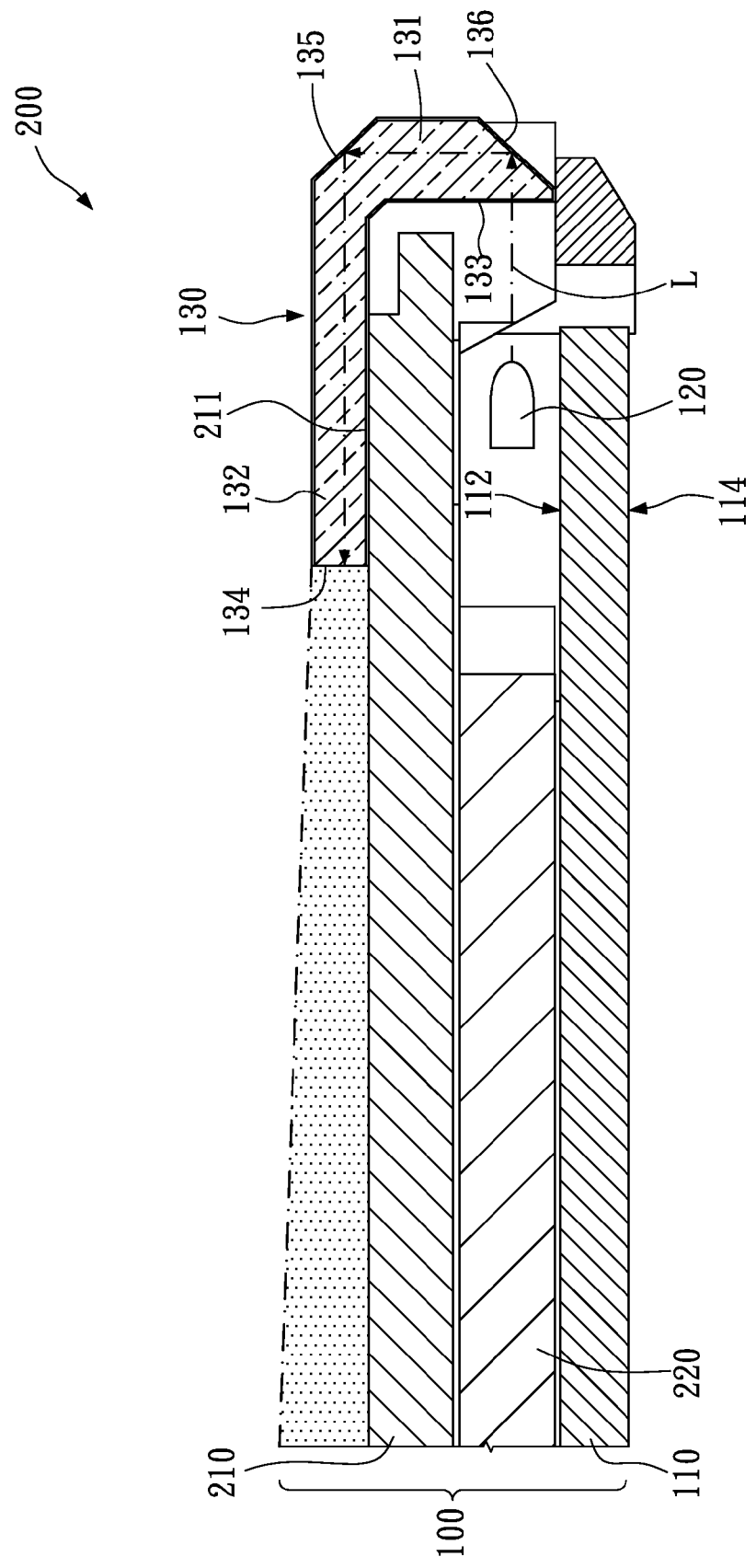
FIG. 4 is a cross-sectional view of a display module according to the second embodiment of the disclosure.

Please refer to FIG. 3 and FIG. 4, which respectively illustrate an illumination assembly 100 and a display module 200 according to a second embodiment of the disclosure. The differences between the second and the first embodiments are that, in the second embodiment, the visual-light source 120 is located closer to the edge of the substrate 110 and emits the visual light toward the direction parallel to the top surface 112, so that the emitting direction of the visual light is parallel to the top surface 112 of the substrate 110. The visual light is reflected twice in the light guide 130, and then exits the light guide 130 through the light-emergence surface 134 along the light-emergence direction.

In order to achieve the twice reflections of the visual light, the light guide 130 further includes a second reflecting surface 136, located at an end of the first light-guiding section 131. The second reflecting surface 136 is used to reflect the visual light entering through the light-incidence surface 133, and make the visual light travel toward the first reflecting surface 135, then be reflected by the first reflecting surface 135, and exit the light guide 130 through the light-emergence surface 134 along the light-emergence direction.

The inclined angle between the second reflecting surface 136 and substrate 110 is approximately 45 degrees, which is not a general limitation to the disclosure. In a practical embodiment, the material of the light guide 130 has a selected index of refraction, so that the visual light is able to have a full reflection when arriving the second reflecting surface 136; in another practical embodiment, an inclined surface is formed outside the first light-guiding section 131 with its external surface, polished and coated with a film, so as to form the second reflecting surface 136 inside the first light-guiding section 131.

The difference of the first and second embodiments is the emitting direction of the light emitted from the visual-light source 120. By reflecting the light once or more in the light guide 130, the light is able to exit through the light-emergence surface 134 along the light-emergence direction. Therefore, the light-emergence surface 134 must be disposed compatibly to the display panel 210, so that the light-emergence direction is able to be parallel to the display panel 210. The emitting direction of the visual light from the visual-light source 120 may be changed randomly, as long as the reflection(s) in the light guide 130 is enough for the visual light to change directions and exit through the light-emergence surface 134.

The embodiments of the disclosure use the light guide 130 to change the illumination of the visual-light source 120, so that the visual-light source 120 may be disposed between an existing space between the display panel 210 and the substrate 110 without additionally occupying any space at the edge of the display panel 210, thereby reducing the height of the illumination assembly 100 raised on the display panel 210 and reducing the border width of the display panel 210. Furthermore, the design of indirect-emitting hidden light source is able to help the user to clearly read the content displayed on the display panel in a dark environment that is lack of environmental lights, and overcome the conventional problems of such display module that has no backlight source for auxiliary illumination.

In the first and second embodiments, although the drawings each shows only one single visual-light source 120, in fact the light guide 130 may be disposed by extending along a direction vertical to a paper surface. Specifically, the light guide 130 may be disposed as an entire row at each of the left and right sides, or disposed as a circled frame at all the top/bottom/left/right four sides of the display module 200. In addition, the illumination assembly 100 may include multiple visual-light sources 120 disposed along the direction vertical to the paper surface, so that each and every edge of the display panel 210 is able to be illuminated evenly by the visual light emitted from the multiple visual-light sources 120.

Figure 5:
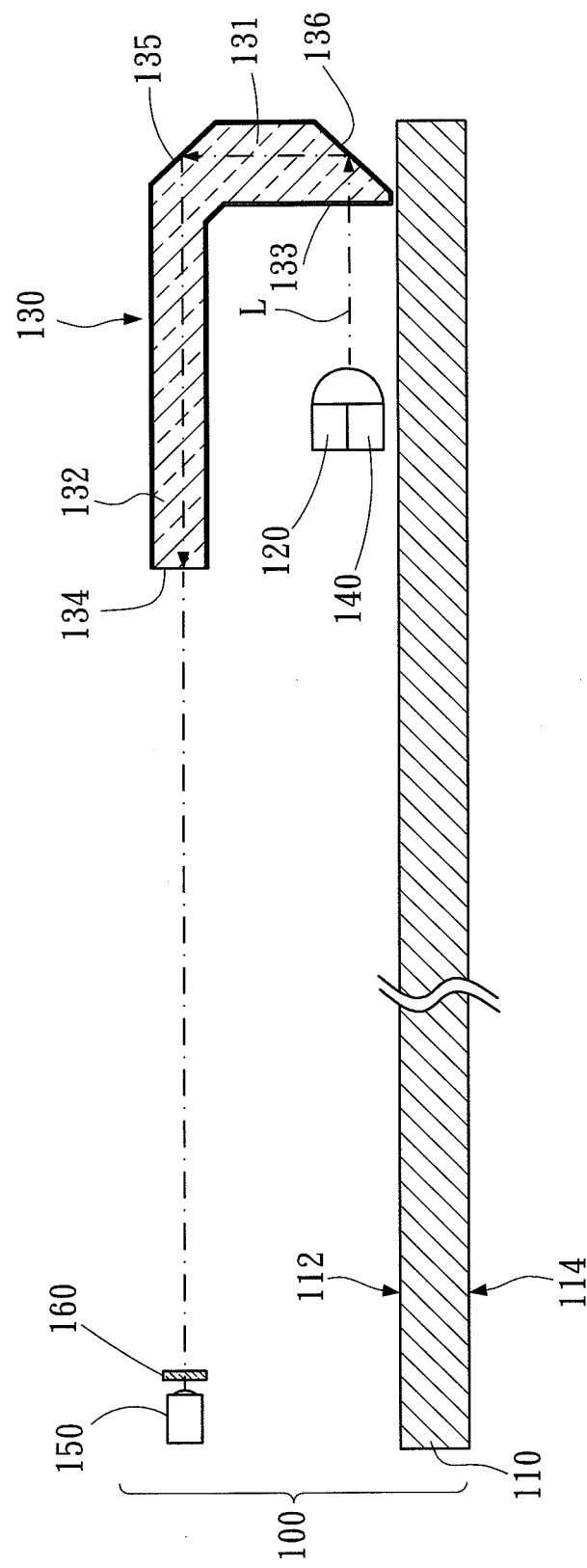
FIG. 5 is a cross-sectional view of an illumination assembly according to a third embodiment of the disclosure.
Figure 6:
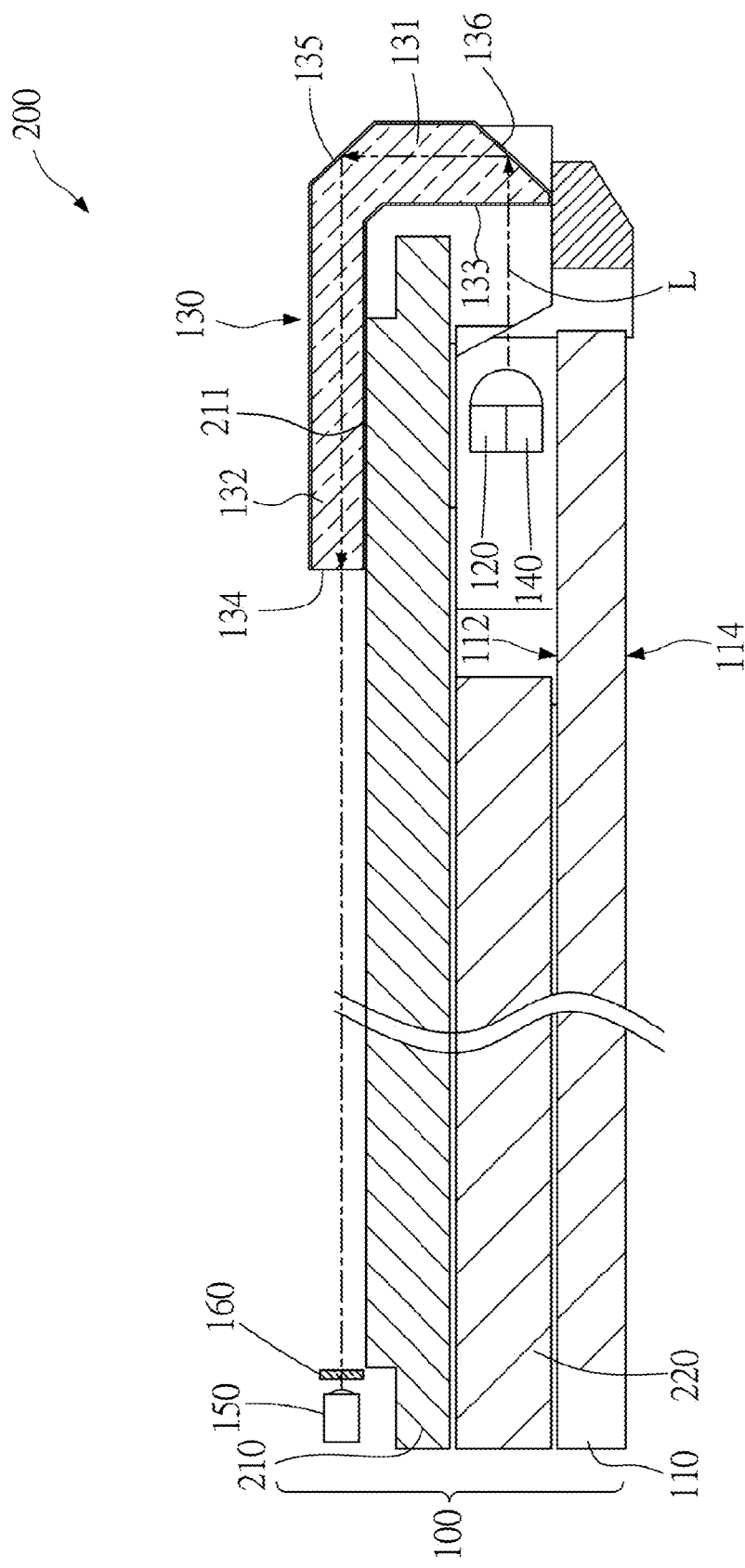
FIG. 6 is a cross-sectional view of a display module according to the third embodiment of the disclosure.

Please refer to FIG. 5 and FIG. 6, which illustrate an illumination assembly 100 and a display module according to a third embodiment. In the third embodiment, the illumination assembly 100 further includes an invisible light source 140 that is disposed on the top surface 112 of the substrate 110 and close to the edge of the substrate 110, so as to emit an invisible light toward the light-incidence surface 133. The invisible light is reflected at least once in the light guide 130, and exits the light guide 130 through the light-emergence surface 134 along the light-emergence direction. In a practical embodiment, the visual-light source 120 and the invisible light source 140 are both light emitting diodes, integrated together as a single package; in different embodiments, each of the visual-light source 120 and the invisible light source 140 is an independent single package.

The illumination assembly 100 or the display module further includes a light sensor 150 and a wavelength-selecting filter 160. The light sensor 150 is disposed at an edge of the display panel 210 and facing the light-emergence surface 134. The wavelength-selecting filled 60 is disposed on the light sensor 150 for selectively allowing the invisible light with certain wavelengths to pass and blocking the visual light; a practical embodiment of the invisible light is infrared light.

The number of each light sensor 150 and the wavelength-selecting filter 160 may be more than one, with every set of the light sensor 150 and the wavelength-selecting filter 160 respectively corresponding to one invisible light source 140. The invisible light source 140 is able to emit the invisible light continuously or intermittently. The invisible light travels in the light guide 130, reflected at least once, and exits the light guide 130 through the light-emergence surface 134 along the light-emergence direction and toward the light sensor 150. Whether the light sensor 150 receives the invisible light is able to determine whether the invisible light is blocked, determines whether a finger or a touch-control stylus is operated on the display panel 210 by the user. Based on cross-comparison of the receiving results of the multiple light sensors 150, the coordinates of the aforesaid touch operations are able to be determined accordingly.

Figure 7:
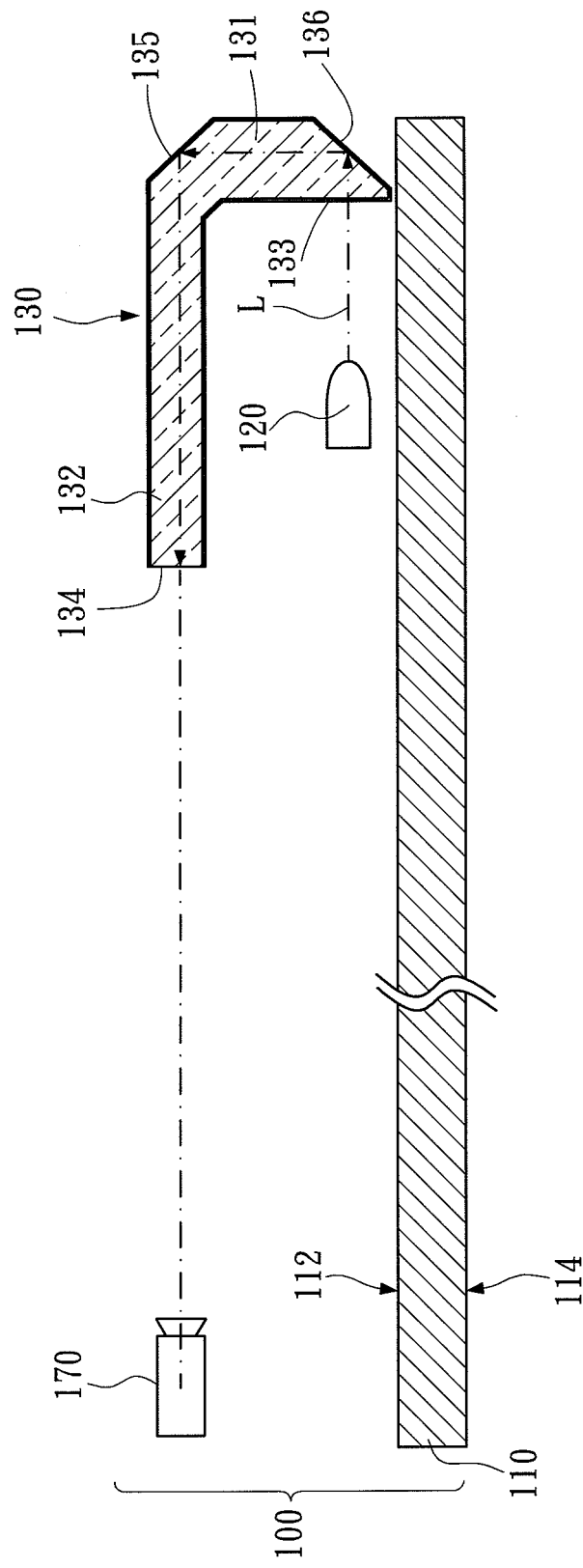
FIG. 7 is a cross-sectional view of an illumination assembly according to a fourth embodiment of the disclosure.
Figure 8:
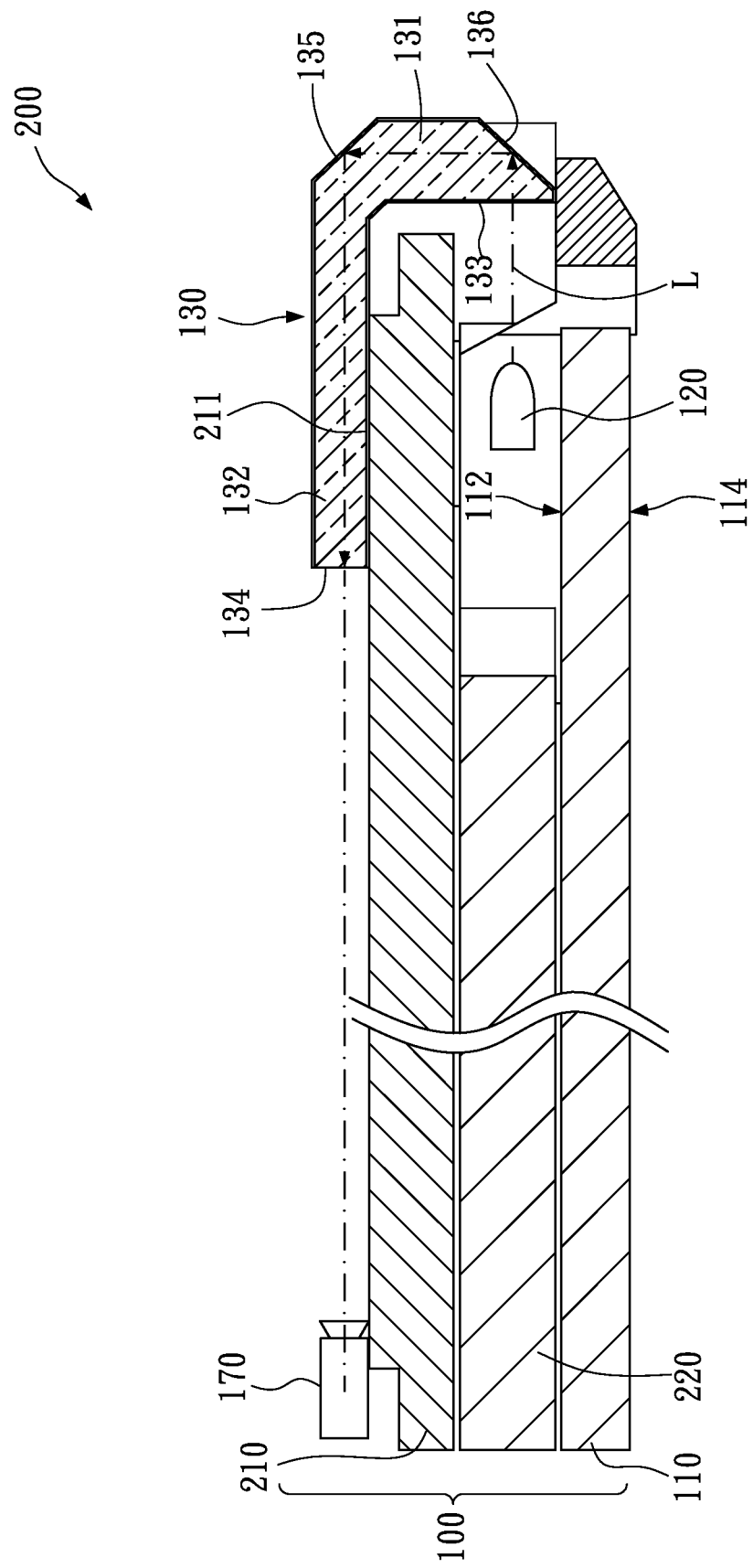
FIG. 8 is a cross-sectional view of a display module according to the fourth embodiment of the disclosure.

Please refer to FIG. 7 and FIG. 8, which illustrate an illumination assembly 100 and a display module according to a fourth embodiment of the disclosure. In the fourth embodiment, the illumination assembly 100 or the display module further includes at least an image capture module 170 that is disposed at an edge of the display panel 210 and captures images facing the light guide 130; Specifically, the image capture module 170 captures images along a direction parallel to the direction of the display panel 210. Through the images captured by the image capture module 170, touch operations of the user's finger or touch-control stylus on the display panel 210 are able to be determined accordingly. Through cross-comparison of the images captured from multiple image capture module 170 the coordinates of the aforesaid touch operations are able to be determined accordingly.

What must be described specifically, is that the light guide 130 of the display module 200 in each of the embodiment may be further covered by a housing, so that the light guide 130 is hidden at an inner side of a border of the housing. In fact, the light guide 130 itself may be part of the display module 200. Specifically, the light guide 130 is exactly a border of the display module 200 or a portion of the border of the housing, without the additional border of the housing covering the light guide 130 and increasing the overall thickness of the entire apparatus.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A display module, comprising:
    a substrate, comprising a side;
    at least a visual-light source, disposed at the side of the substrate for emitting a visual light;
    a reflective display panel, only being visible by reflecting an environment light, disposed on the substrate for displaying a screen image on a viewing surface to be read by a user under the environment light; and
    a light guide, transparent and disposed corresponding to the side of the substrate, the light guide comprising a first light-guiding section and a second light-guiding section that connect to each other in a substantially perpendicular manner to guide the visual light emitted from the visual-light source along a light-incidence direction, so that the visual light is reflected at least once in the light guide and then exits the light guide along a light-emergence direction different from the light-incidence direction, wherein the first light-guiding section has a light-incidence surface at an end to face the visual-light source to receive the emitted visual light, the second light-guiding section is adjacent to and substantially disposed only upon a side edge of the viewing surface of the reflective display panel and has a light-emergence surface at an end to have the reflected visual light exit, so that the reflected visual light exited from the light-emergence surface will laterally travel along the viewing surface of the reflective display panel and be reflected by the viewing surface.

2. The display module according to claim 1 further comprising an isolation sheet disposed between the reflective display panel and the substrate.

3. The display module according to claim 1, wherein the light-incidence surface is parallel to a top surface of the substrate.

4. The display module according to claim 1, wherein the first light-guiding section and the second light-guiding section is an integrally formed single transparent component.

5. The display module according to claim 1, wherein the light guide further comprises a first reflecting surface located at an intersection of the first light-guiding section and the second light-guiding section for reflecting lights.

6. The display module according to claim 5, wherein the light entering the first light-guiding section is reflected by the first reflecting surface and then travels toward the second light-guiding section.

7. The display module according to claim 1, wherein the light guide further comprises a second reflecting surface located close to the light-incidence surface of the first light-guiding section, so as to reflect and make the entering light travel toward the first reflecting surface for a second time reflection.

8. The display module according to claim 1, wherein at least one of the reflections of an entering light in the light guide is a full reflection.

9. The display module according to claim 1 further comprising:
    an invisible light source, adjacent to or integrated with the visual-light source, disposed at the side of the substrate for emitting an invisible light towards the light-incidence surface, and the invisible light being reflected at least once in the light guide and then exiting the light guide through the light-emergence surface along the light-emergence direction; and
    a light sensor, facing the light-emergence surface for receiving the invisible light exited from the light-emergence surface to detect whether the exited invisible light is blocked to determine whether a finger or a touch-control stylus is operated on the reflective display panel by the user so that a coordinate of the finger or the touch-control stylus is determined accordingly.

10. The display module according to claim 9 further comprising a wavelength-selecting filter disposed on the light sensor for selectively allowing the invisible light with certain wavelengths to pass and be received by the light sensor.

11. The display module according to claim 9 further comprising an image capture module disposed at an edge of the reflective display panel, capturing images along the direction of the reflective display panel to determine whether a finger or a touch-control stylus is operated on the reflective display panel by the user so that a coordinate of the finger or the touch-control stylus is determined accordingly.

12. The display module according to claim 1, wherein the light guide is a border of the display module or a portion of the border.

13. The display module according to claim 1, wherein the display panel is an Electro-Phoretic Display.

* * * * *